United States Patent Office 2,907,845
Patented Oct. 6, 1959

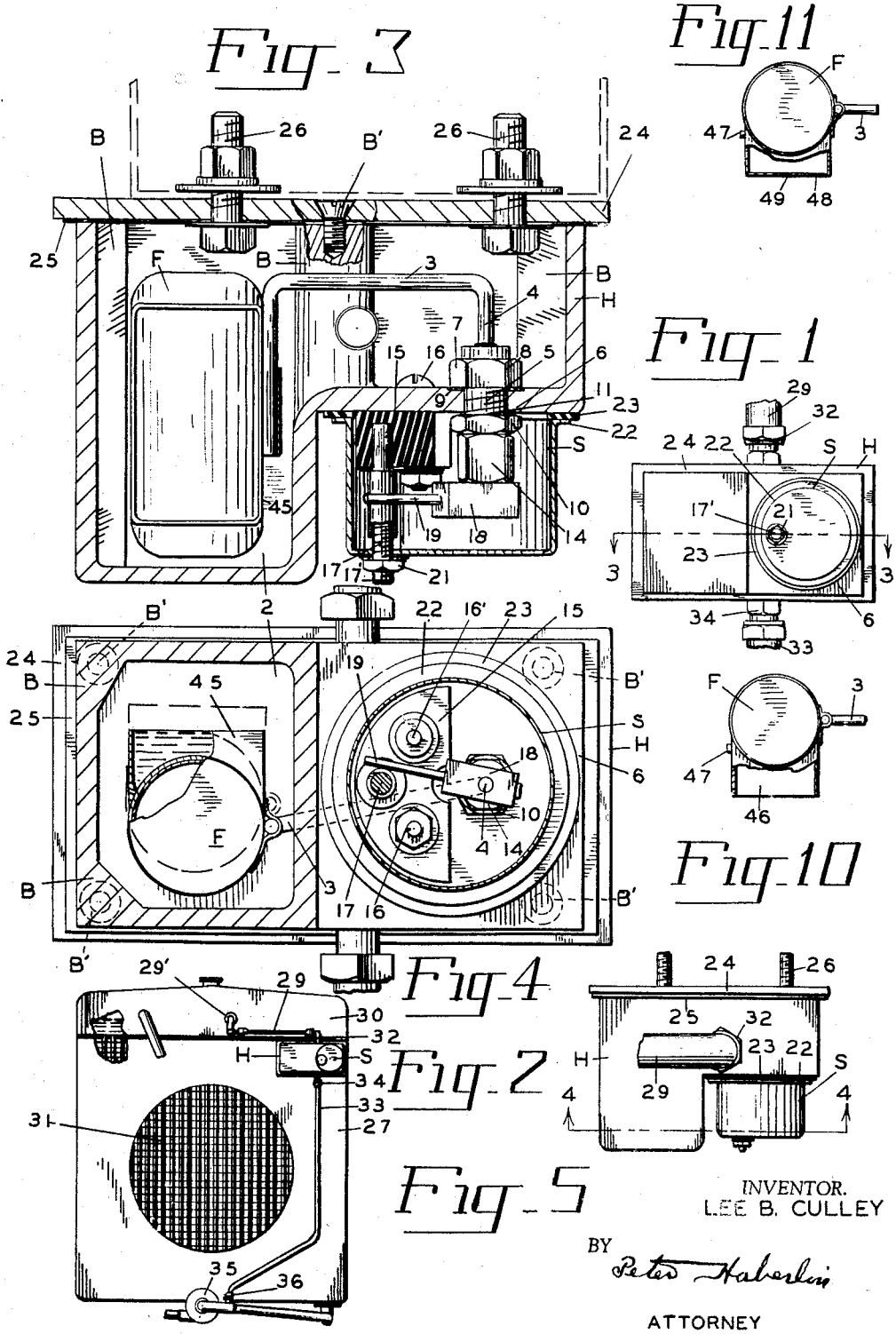

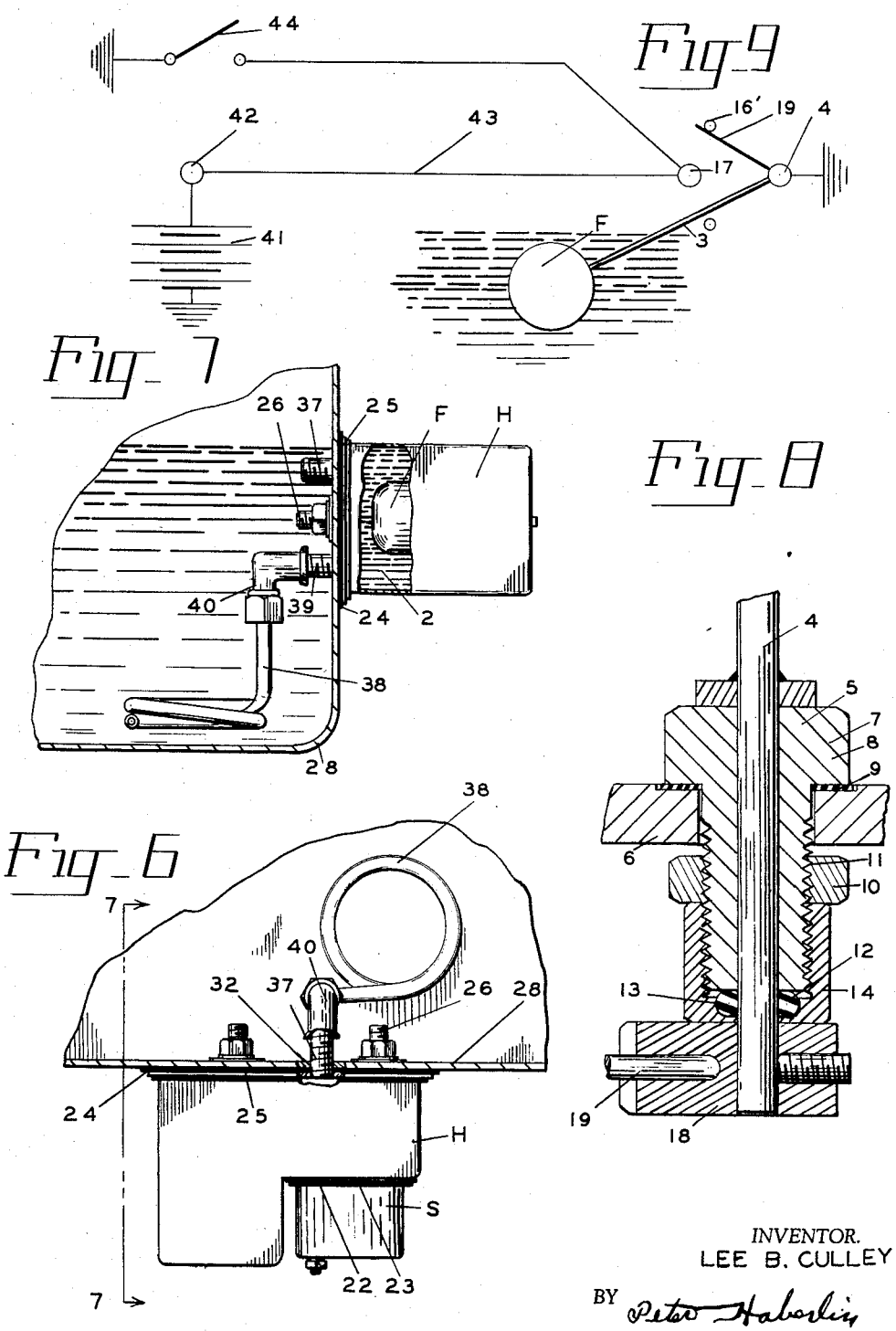

2,907,845
FLOAT CONTROLLED SWITCH

Lee B. Culley, Portland, Oreg.

Application July 16, 1957, Serial No. 672,216

2 Claims. (Cl. 200—84)

This invention relates to liquid level indicators, but more particularly to an assembly adapted to be attached to radiators or crank cases of internal combustion engines that operate motor vehicles, and especially to the diesel type of engine for driving heavier type vehicles such as trucks, passenger buses, or any form of heavy vehicle.

This application may be considered as a further amplification and development of the structure described in a pending application filed by present applicant in the United States Patent Office March 25, 1956, and identified by Serial No. 573,686.

One object of the disclosed embodiment of this invention is to have a light placed in the panel of a vehicle which is electrically controlled by the raising and lowering of liquids operated by a float attached within a chamber forming part of an assembly which is attached to a crank case or radiator remote from the panel, and further.

To provide means to notify the operator of the condition of the liquid level prior to the drop of said liquid to the danger level in order that the liquid may be replenished.

Another object is the provision of means within the indicator for periodically testing the functioning qualities of the assembly, and again.

To provide an assembly of this kind so constructed that it may be affixed to any type of motor vehicle without obstructing the normal functioning of said vehicle.

Other objects and advantages of the embodiment of this invention will become apparent in the following specification and appended claims, which taken in connection with the accompanying drawings form part of this application, of which—

Figure 1 is a face view of the float and switch combination to be inserted within the liquid line of the cooling system of an engine, or adjacent the oil reservoir;

Figure 2 is a plan view of Figure 1;

Figure 3 is an enlarged plan sectional view, taken on line 3—3 of Figure 1, illustrating the float chamber, together with the electric switch mechanism;

Figure 4 is a front sectional elevation, taken on line 4—4 of Figure 2, looking into the float chamber switch compartment;

Figure 5 illustrates the device connected to the radiator circulating system of a motor vehicle radiator;

Figure 6 is a fragmentary plan view of the device mounted within the reservoir of the crank case of the engine;

Figure 7 is a sectional view through the oil reservoir of the engine, showing the liquid indicating device partially broken away for convenience of illustration;

Figure 8 is an enlarged sectional view showing the method of mounting the float shaft within the switch compartment;

Figure 9 is a diagram of the electrical and mechanical operation of the structure;

Figure 10 is an alternate form of float structure; and

Figure 11 is still another alternate form of float structure.

Now with more detailed reference to the drawings the letter H indicates a housing having a switch box S attached thereto and depending therefrom as in Figure 3, while a float F operates in chamber 2 of housing H and is pivotally attached to a right angular arm 3 which is integral with shaft 4, while said shaft is journaled in elongated bearing 5 which is secured to wall 6 of chamber 2 and passes outwardly into switch box S as shown in Figures 3 and 8.

The elongated bearing 5 comprises a stud bolt 7 whose head 8 contacts sealing gasket 9 which is countersunk into a portion of wall 6, while lock or jam nut 10 is threaded to said bearing within switch box S by means of threads 11. A liquid-tight seal is formed around shaft 4 by means of an O-ring 12 which fits into a channel defined adjacent end 13 of threaded cap 14 which registers with threads 11 of bearing 5. Threaded cap 14 is locked to the threads by way of the lock or jam nut 10, which is also threaded to the threads 11 of said stud bolt, preventing the cap from rotating with the shaft once the same is adjusted to the proper tension on the O-ring, which maintains a liquid seal. The inner perimeter of said O-ring contacts the outer perimeter of shaft 4.

Attached to wall 6 within switch box S is a dielectric block 15 secured thereto by bolts 16 and 16', while a terminal post is fixed into said block for purposes to more fully be explained in detail.

A detent 18 is adjustably fastened to the end of shaft 4 by means of a set screw as shown in Figures 3 and 4, while an integral contact arm 19 extends from said detent and is adapted to register with post 17 when float F is lowered within float chamber 2, but when the liquid in said chamber rises, the contact arm engages bolt 16', to prevent the float from unnecessary movement beyond predetermined limits while the vehicle is in transit.

When switch bar 19 engages terminal 17, electric energy will flow from the source of supply through terminal 17, and switch bar 19 which is grounded to the frame of the vehicle through float valve F, which will complete the circuit through the light located in the panel in view of the operator.

Switch box S is attached to wall 6 of housing H by means of the free end 17' of terminal post 17 and nut 21 which is threaded thereto, while flange 22 of said switch box is insulated from said wall by gasket 23.

Housing H has detachably fastened thereto a cover 24 by means of a plurality of bosses B and screws B', and sealed against leakage by means of gasket 25, while bolts 26 pass through cover 24 attaching the housing to any desired position such as to the radiator 27 as shown in Figure 5, or to the crank case 28 as in Figures 6 and 7.

When the housing is attached to radiator 27, a pipe 29 connects said radiator to reservoir 30 located above grill 31 and leads into the top of housing H, at 32. It has been found by careful tests that by connecting pipe 33 to the bottom of housing H as at 34 and to liquid pump 35 as at 36, water may be delivered to float chamber 2 continuously until the level within reservoir 30 has dropped to a warning level.

When the water within reservoir 30 drops below the intake 29', air will be sucked into the float chamber 2 instead of water by way of the suction of the pump 35, causing float F to immediately drop to engage the switch bar 19 with terminal 17, completing an electric circuit through the warning light 42. When this level is reached the operator is cognizant of the fact that he may drive a reasonable distance to a place where water can be added to the radiator. Housing H can be located anywhere between the reservoir 3 of the radiator and the pump 35.

When the liquid level indicator is associated with the crank case for indicating the level, the housing H is secured to crank case 28 by means of bolts 26; a nipple 37 is screwed through cover 24 extending through the wall of the crank case as shown in Figures 6 and 7. This nipple permits oil to enter float chamber 2, raising float F, which breaks the electric circuit leading to the low level indicator, and when the oil in the crank case is lowered, the indicator level in the float chamber is also lowered showing that oil should be added to the crank case.

In order to prevent the light from flashing on and off intermittently when the operator makes sharp turns causing shifts of the oil within the crank case, a tubular coil 38 is provided which extends into crank case 28 and is connected to nipple 39 by means of pipe fitting 40, thus forming a liquid lock to prevent draining from the float chamber.

Now with reference to Figure 9 it will be observed that float F is in raised position where contact bar 19 registers with pin 16', but when said float lowers, the contact bar will register with post 17 thus closing the circuit from source of supply 41, through indicator light 42, conductor 43, post 17, contact bar 19 and into the ground through shaft 4, and metal casing of housing H to the frame of the vehicle.

A testing switch 44 is provided to be operated as a push button (not shown) located at any convenient place by the operator for the purpose of periodically testing the circuit. When the circuit is closed by the operator and the signal fails to flash, this condition notifies the operator of a break somewhere within said circuit.

For the purpose of insuring a positive action of the float in actuating shaft 4 in bearing 5 and O-ring 12, a liquid container 45 is superimposed on float F, so that with the lowering of liquid in the float chamber, the liquid in container 45 adds weight to said float until it becomes submerged when such additional weight neutralizes since it is of equal weight with the water in the float chamber.

Figures 10 and 11 show alternate forms of such containers. Figure 10 showing one container with an open bottom 46, having a bleeder hole 47 passing through one side thereof above the bottom to release any trapped air from said container, while Figure 11 has a closed bottom 48 at the lower side thereof through which a bleeder 49 passes for the purpose of permitting the drainage of water at a slower speed than when it enters through the open bottom of Figure 10.

While this invention has been described in detail and with specific illustrations, it is understood that other modifications in construction and arrangement of parts may be devised without departing from the spirit and scope of the invention. The present embodiment is illustrative but not restrictive, since the scope and purview of the invention is indicated by the appended claims rather then by the foregoing description.

Having thus fully illustrated and described an embodiment of the invention and a method of producing the same, in a manner that may enable others skilled in the art to which it appertains to construct and use the same, what is claimed and desired to be secured by Letters Patent, is:

1. A float controlled switch comprising a liquid containing housing, a switch box attached to said housing, a bearing located in said switch box and housing, a float chamber forming part of said housing, a float vertically operable in said chamber, an arm pivoted to said float, a shaft integral with said arm and passing longitudinally of said bearing, a liquid container superimposed on the float to insure positive action of the shaft by adding weight to the float to neutralize the equal weight of water in the float chamber, means integral with the container to release air from said container, and electrically operated means to actuate the switch when the float reaches a predetermined level within the float chamber.

2. A float controlled switch as defined in claim 1, having a source of electrical supply, a contact bar within the switch box, a pin with which said contact bar registers when the float is in raised position, a post with which said contact bar registers when the float is in lowered position, thus closing the source of electrical supply.

References Cited in the file of this patent

UNITED STATES PATENTS

| | | |
|---|---|---|
| 1,945,317 | Kalin | Jan. 30, 1934 |
| 2,467,189 | Cohen et al. | Apr. 12, 1949 |
| 2,604,522 | Monroe | July 22, 1952 |

FOREIGN PATENTS

| | | |
|---|---|---|
| 2,277 | Great Britain | Jan. 29, 1904 |